United States Patent
Caputo et al.

(10) Patent No.: US 7,532,710 B2
(45) Date of Patent: May 12, 2009

(54) SYSTEMS AND METHODS FOR PROVIDING VOICEMAIL SERVICES

(75) Inventors: Edward J. Caputo, Fairfax, VA (US);
Scott O. Sherman, Solon, IA (US);
Steven C. Johnson, Bethesda, MD (US)

(73) Assignee: Verizon Business Global LLC, Basking Ridge, NJ (US)

( * ) Notice: Subject to any disclaimer, the term of this patent is extended or adjusted under 35 U.S.C. 154(b) by 62 days.

(21) Appl. No.: 10/991,515

(22) Filed: Nov. 19, 2004

(65) Prior Publication Data

US 2005/0111635 A1    May 26, 2005

Related U.S. Application Data (60) Provisional application No. 60/523,690, filed on Nov. 21, 2003.

(51) Int. Cl.
*H04M 11/00* (2006.01)
*H04M 1/64* (2006.01)

(52) U.S. Cl. ............ 379/88.18; 379/88.12; 379/88.25

(58) Field of Classification Search ............ None
See application file for complete search history.

(56) References Cited

U.S. PATENT DOCUMENTS

| | | | | |
|---|---|---|---|---|
| 5,172,404 A * | 12/1992 | Hashimoto | ............ | 379/88.18 |
| 5,623,538 A * | 4/1997 | Petty | ............ | 379/88.13 |
| 5,675,637 A * | 10/1997 | Szlam et al. | ............ | 379/142.17 |
| 5,825,869 A * | 10/1998 | Brooks et al. | ............ | 379/265.12 |
| 5,903,627 A * | 5/1999 | Shaffer et al. | ............ | 379/67.1 |
| 5,995,596 A * | 11/1999 | Shaffer et al. | ............ | 379/88.18 |
| 5,999,595 A * | 12/1999 | Shaffer et al. | ............ | 379/88.18 |
| 6,002,751 A * | 12/1999 | Shaffer | ............ | 379/88.18 |
| 6,208,717 B1 * | 3/2001 | Yeh et al. | ............ | 379/88.18 |
| 6,233,318 B1 * | 5/2001 | Picard et al. | ............ | 379/88.17 |
| 6,311,057 B1 * | 10/2001 | Barvesten | ............ | 455/415 |
| 6,542,584 B1 * | 4/2003 | Sherwood et al. | ............ | 379/88.18 |
| 6,556,663 B2 * | 4/2003 | Danner et al. | ............ | 379/67.1 |
| 6,697,458 B1 * | 2/2004 | Kunjibettu | ............ | 379/88.17 |
| 6,928,149 B1 * | 8/2005 | Panjwani et al. | ............ | 379/88.25 |
| 7,379,540 B1 * | 5/2008 | Van Gundy | ............ | 379/88.18 |

\* cited by examiner

*Primary Examiner*—Curtis Kuntz
*Assistant Examiner*—Joseph T Phan (57) ABSTRACT

A system includes a first network device and a second network device. The first network device is configured to receive a voicemail message for a called party, determine whether a second network device is available, and transfer the voicemail message to the second network device when the second network device is determined to be available. The second network device is configured to store the voicemail message in a mailbox associated with the called party, and automatically provide a network device associated with the called party with access to the voicemail message in response to a network address associated with the network device matching a subscriber identifier in a list of subscriber identifiers.

17 Claims, 7 Drawing Sheets

SYSTEMS AND METHODS FOR PROVIDING VOICEMAIL SERVICES

RELATED APPLICATION

This application claims priority under 35 U.S.C. § 119 based on U.S. Provisional Application No. 60/523,690, filed Nov. 21, 2003, the disclosure of which is incorporated in its entirety herein by reference.

FIELD OF THE INVENTION

Implementations consistent with the principles of the invention relate generally to communications networks and, more particularly, to systems and methods for providing voicemail services in a communications network.

BACKGROUND OF THE INVENTION

Voicemail systems exist for receiving, storing, and providing voicemail messages for subscribers of the voicemail system. A "subscriber" is a person that has actively subscribed to the voicemail system by creating either (1) a voice mailbox and/or (2) a billing relationship with the provider where the subscriber agrees to pay money, either directly or indirectly through the purchase of other services, for use of the voicemail system.

It will be appreciated that situations exist when a subscriber's voicemail system is unavailable. For example, the voicemail system may have experienced a power outage or some other event that has caused the voicemail system to go "off-line." In such instances, callers may not be able to leave a voicemail message for the subscriber, causing the subscriber to miss the call and resulting in poor customer satisfaction.

Moreover, in order for the subscriber to retrieve voicemail messages from the voicemail system, the subscriber typically is required to provide his/her telephone number and authentication information. When the subscriber is accessing his/her voicemail account from a home or personal telephone, the requirement for the subscriber to provide authentication information each time the subscriber accesses the voicemail account can be burdensome.

SUMMARY OF THE INVENTION

In an implementation consistent with the principles of the invention, a method includes storing, at a first network device, a voicemail message on behalf of a second network device; determining whether the second network device is available; and transferring the stored voicemail message to the second network device when the second network device is determined to be available.

In another implementation consistent with the principles of the invention, a system includes a first network device and a second network device. The first network device is configured to receive a voicemail message for a called party, determine whether a second network device is available, and transfer the voicemail message to the second network device when the second network device is determined to be available. The second network device is configured to receive the transferred voicemail message, and store the voicemail message in a mailbox associated with the called party.

In still another implementation consistent with the principles of the invention, a method includes capturing a network address of a network device, comparing the network address to a stored list of identifiers, and automatically providing the network device with access to a voicemail account in response to the network address matching an identifier in the stored list of identifiers.

In a further implementation consistent with the principles of the invention, a system includes a first network device and a second network device. The first network device is configured to receive a voicemail message for a called party, determine whether a second network device is available, and transfer the voicemail message to the second network device when the second network device is determined to be available. The second network device is configured to store the voicemail message in a mailbox associated with the called party, and automatically provide a network device associated with the called party with access to the voicemail message in response to a network address associated with the network device matching a subscriber identifier in a list of subscriber identifiers.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention provide improved voicemail processing. In one implementation, a group of voicemail devices is provided that is connected via a data network. The data network allows coordination amongst the voicemail devices in the event of a failure, maintenance outage, or temporary overloading of one of the devices. In such an event, another one of the voicemail devices can act as a backup and perform the functions of the voicemail device undergoing the event in a manner that is transparent to callers.

In other implementations, a voicemail system provides immediate voicemail access to subscribers when, for example, the subscriber's telephone number matches a list of stored subscriber numbers. In this way, the need for a subscriber to enter identifying information can be eliminated.

EXEMPLARY SYSTEM

Figure 1:
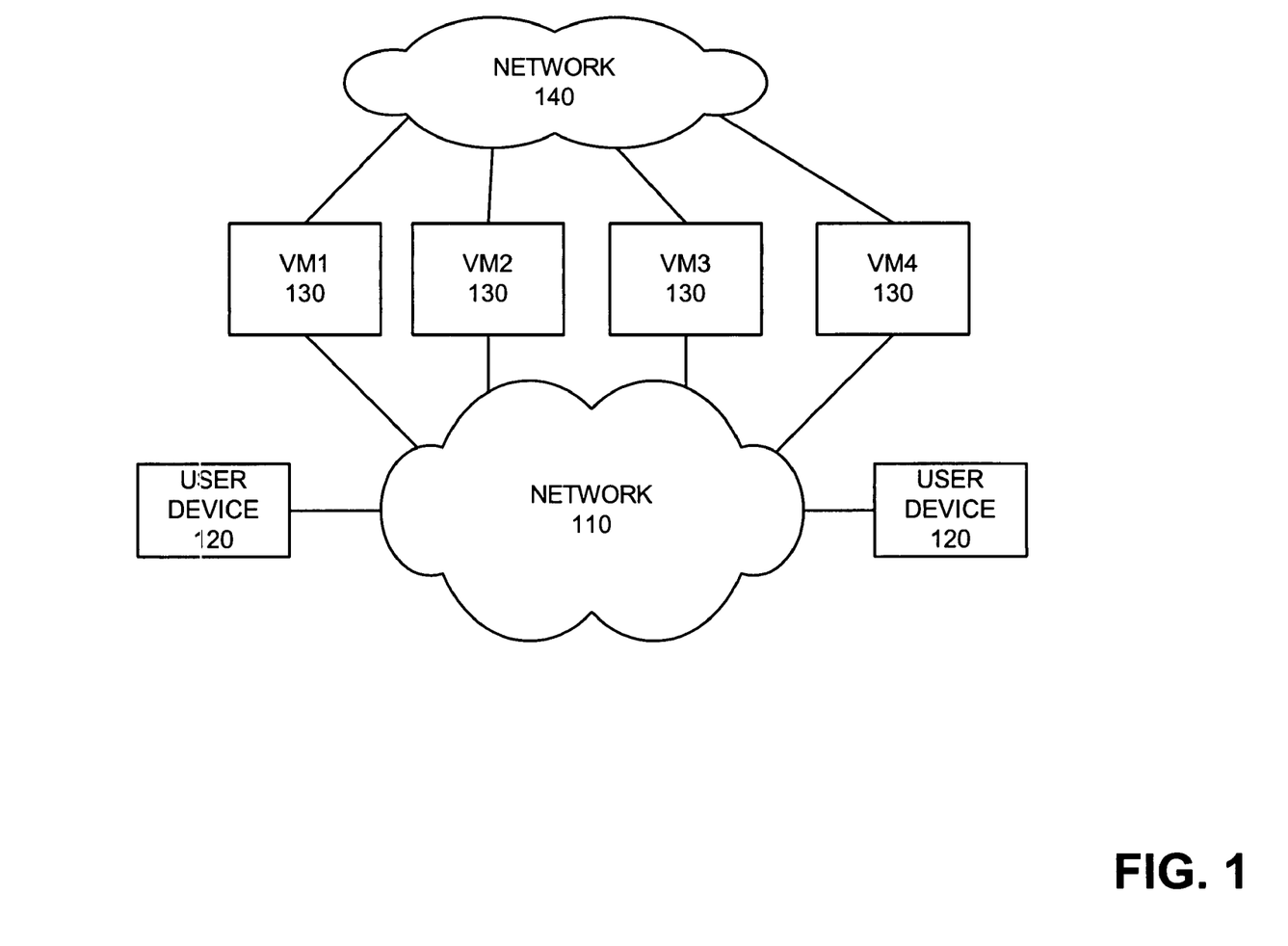
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a first network 110, user devices 120, a group of voicemail (VM) devices 130, and a second network 140. The number of devices and networks illustrated in FIG. 1 is provided for simplicity. In practice, a typical system could include more or fewer devices and networks than illustrated in FIG. 1.

Networks 110 and 140 may include a local area network (LAN), a wide area network (WAN), a telephone network, such as the Public Switched Telephone Network (PSTN), an intranet, the Internet, a similar or dissimilar network, or a combination of networks. In one implementation consistent with the principles of the invention, network 110 may include a PSTN and network 140 may include a WAN.

Devices 120 may include a device capable of transmitting voice signals to a network, such as network 110. In one implementation, devices 120 may include a type of telephone system, such as a plain old telephone system (POTS) telephone, a session initiation protocol (SIP) telephone, a wireless telephone device (e.g., a Personal Communications System (PCS) terminal that may combine a cellular radiotelephone with data processing, facsimile, and data communications capabilities, a Personal Digital Assistant (PDA) that can include a radiotelephone, a pager, an Internet/intranet access, a Web browser, an organizer, a calendar, and/or a global positioning system (GPS), or the like), etc. In another implementation, devices 120 may include a type of computer system, such as a mainframe, minicomputer, personal computer, a laptop, or the like. Devices 120 may connect to network 110 via any conventional technique, such as wired, wireless, or optical connections.

VM devices 130 may include one or more network devices (e.g., voicemail servers) that perform voicemail services, such as receiving, storing, and providing voicemail messages. In one implementation, VM devices 130 may be associated with subscribers or subscriber loops with which the subscribers are associated. As will be described in greater detail below, in some instances, one of VM devices 130 may perform the functions of a second VM device 130 during periods when the second VM device 130 is unavailable. VM devices 130 may connect to network 140 via wired, wireless, or optical connections. VM devices 130 may communicate with each other through network 140. In one implementation, network 140 may be used to provision VM devices 130, update software and data table contents within VM devices 130, collect billing events from VM devices 130, and manage VM devices 130.

Figure 2:
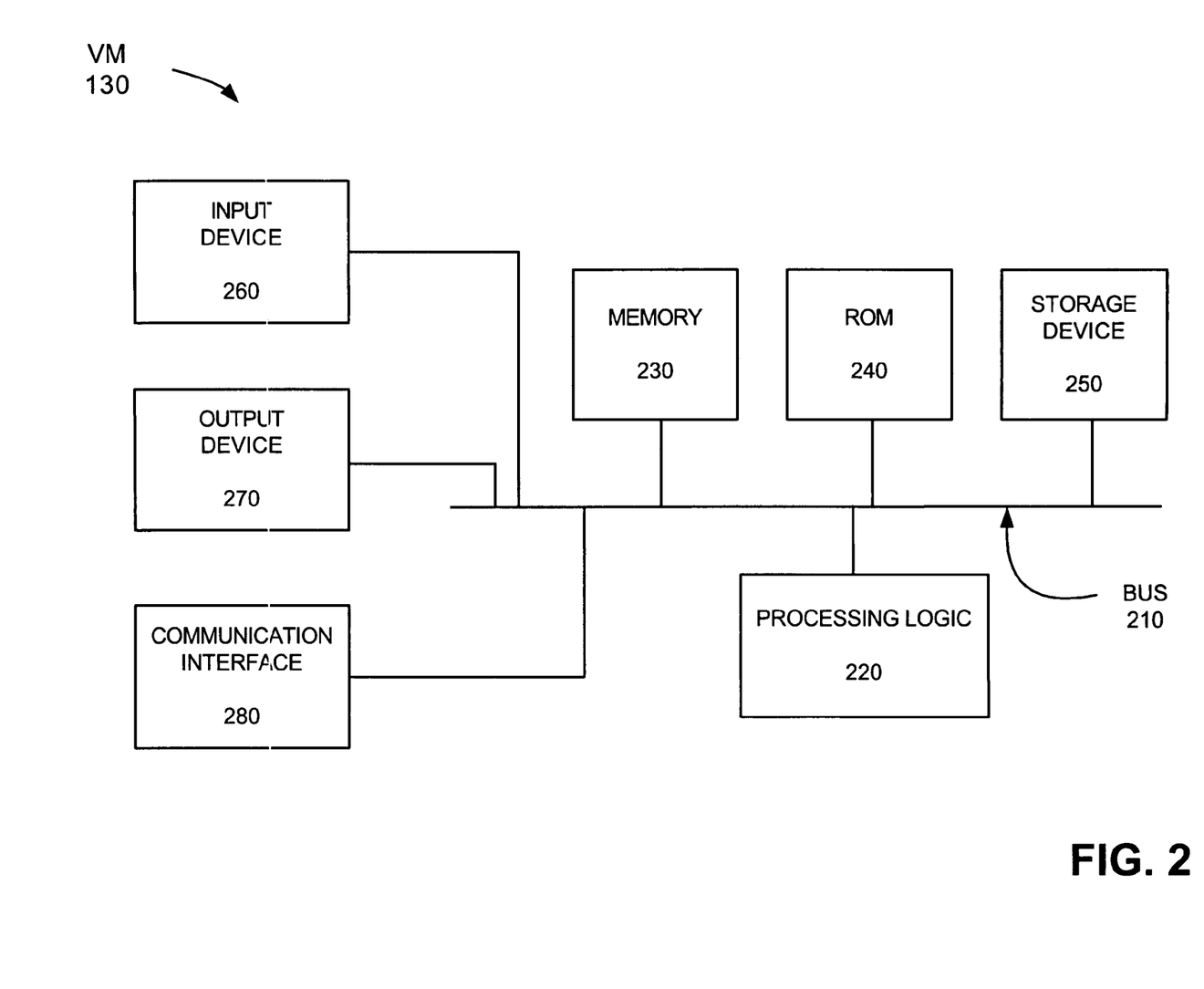
FIG. 2 illustrates an exemplary configuration of the voicemail system of FIG. 1 in an implementation consistent with the principles of the invention.

FIG. 2 illustrates an exemplary configuration of a VM device 130 in an implementation consistent with the principles of the invention. As illustrated, VM device 130 may include a bus 210, processing logic 220, a memory 230, a read only memory (ROM) 240, a storage device 250, an input device 260, an output device 270, and a communications interface 280. It will be appreciated that VM device 130 may include other components (not shown) that aid in receiving, transmitting, and/or processing voicemail messages.

Bus 210 may permit communication among the components of VM device 130. Processing logic 220 may include any type of conventional processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220. ROM may include a conventional ROM device and/or another type of static storage device that stores static information and instructions for the processing logic 220. Storage device 250 may include some other type of magnetic or optical recording medium and its corresponding drive for storing information and/or instructions.

Input device 260 may include a conventional device that permits an operator to input information to VM device 130, such as a keyboard, a keypad, a mouse, a pen, a microphone, one or more biometric mechanisms, and the like. Output device 270 may include a conventional device that outputs information to the operator, including a display, a printer, a speaker, etc.

Communication interface 280 may include any transceiver-like mechanism that enables VM device 130 to communicate with other devices and/or systems. For example, communication interface 280 may include mechanisms for communicating with another device or system via a network, such as network 110 or 140.

As will be described in detail below, VM device 130, consistent with the principles of the invention, may perform voicemail services. VM device 130 may perform these and other services in response to processing logic 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Figure 3:
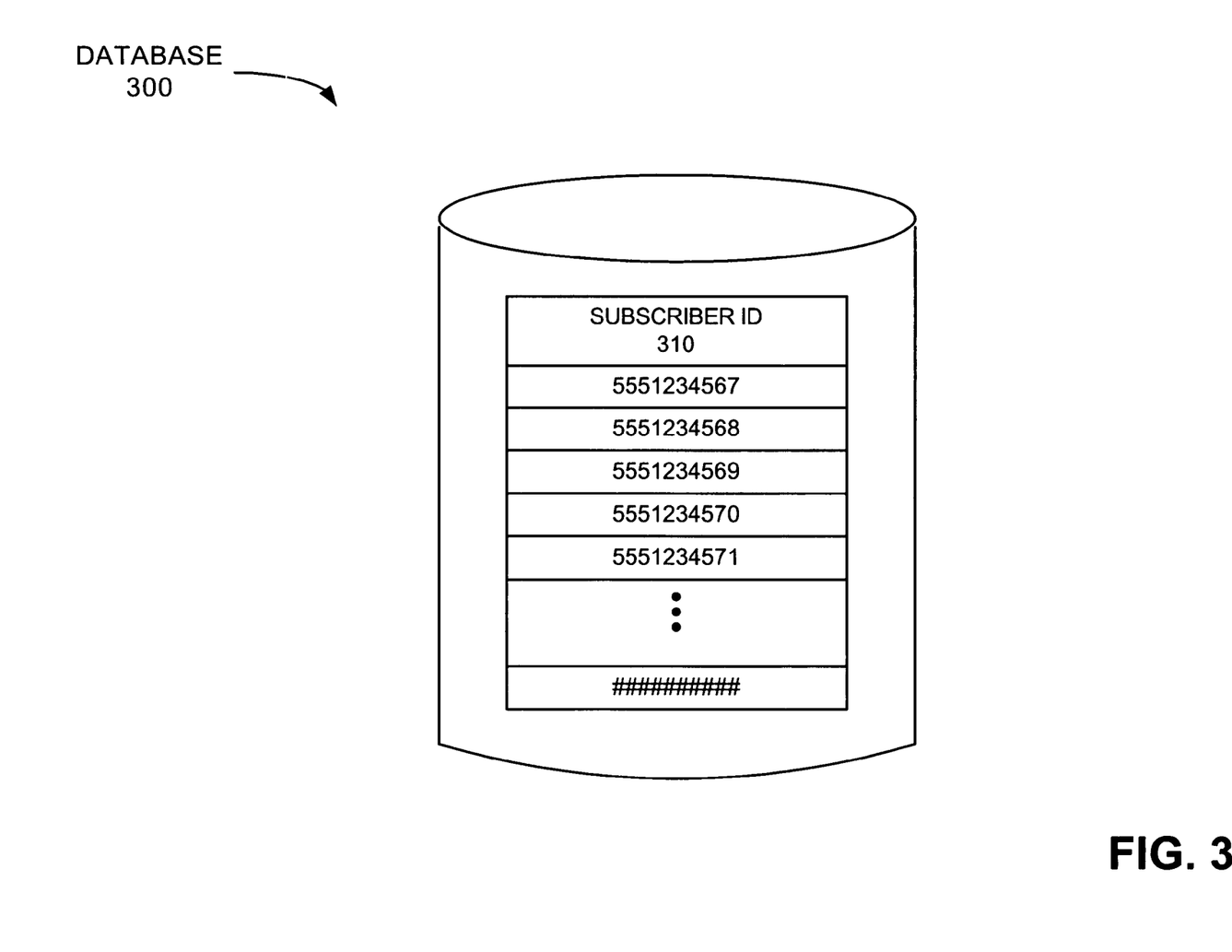
FIG. 3 illustrates an exemplary database that may be associated with the voicemail system of FIG. 1 in an implementation consistent with the principles of the invention.

FIG. 3 illustrates an exemplary diagram of a database 300 that may be associated with a VM device 130 in an implementation consistent with the principles of the invention. While only one database is described below, it will be appreciated that database 300 may consist of multiple databases stored locally at VM device 130, or stored at different locations throughout network 110 or 140. Moreover, each VM device 130 may be associated with a separate database 300 or database 300 may be associated with all of VM devices 130. In other implementations consistent with the principles of the invention, database 300 may be associated with one or more other devices in system 100. For example, database 300 may be associated with a switch (or other network device) included within network 110.

As illustrated, database 300 may includes a group of entries in the following exemplary field: subscriber identification (ID) field 310. Database 300 may contain additional fields (not shown) that aid VM device 130 in providing voicemail services.

Subscriber identification field 310 may store an identifier that uniquely identifies a subscriber device, such as one of user devices 120. The identifier may include, for example, a unique group of characters. In one implementation, the identifier includes a network address, such as a telephone number, that may be associated with a subscriber device. As will be described in detail below, VM device 130 may use database 300 to identify whether an incoming call is from a subscriber associated with that VM device 130.

EXEMPLARY PROCESSING

Figure 4A:
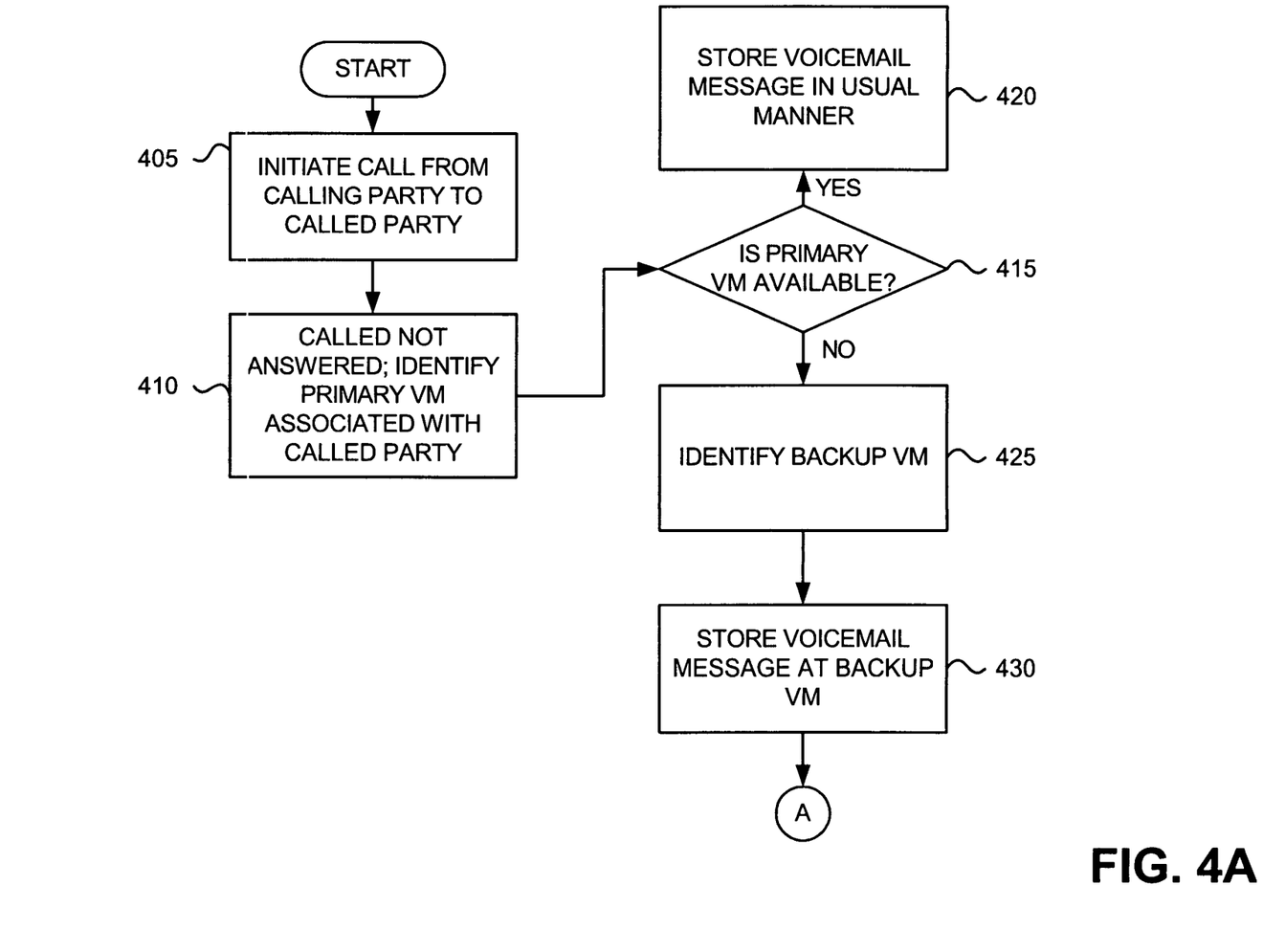
FIGS. 4A and 4B illustrate an exemplary process for processing voicemail messages in an implementation consistent with the principles of the invention.
Figure 4B:
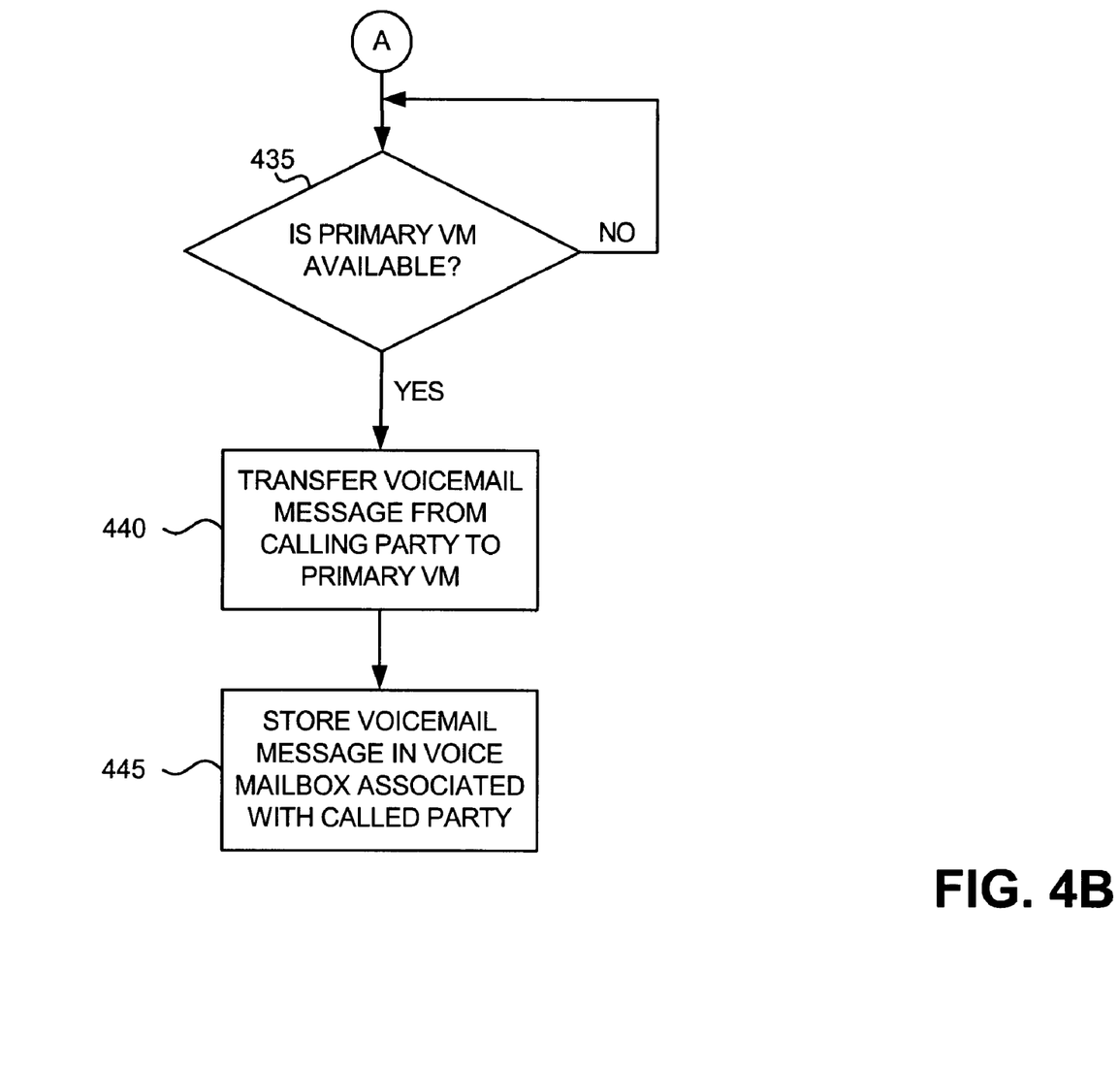

FIGS. 4A and 4B illustrate an exemplary process for processing voicemail messages in an implementation consistent with the principles of the invention. Processing may begin with a calling party using a user device, such as user device 120, initiating a call to a desired called party at, for example, another user device 120 (act 405). The calling party may initiate the call by, for example, dialing a telephone number associated with the called party's user device 120.

In the scenario of FIGS. 4A and 4B, the called party will not answer the call from the calling party (act 410). Instead, the call is routed to a VM device 130 for recording a voicemail message. In response to the call not being answered by the called party, a primary VM device 130 may be identified (act 410). The primary VM device 130 may be the VM device associated with the called party's user device 120 or the subscriber loop to which the called party's user device 120 is associated. Assume, for explanatory purposes, that VM4 130 in FIG. 1 is identified as the primary VM device.

It may then be determined if the primary VM device 130 (i.e., VM4) is available (act 415). There are several reasons that VM4 may be unavailable. For example, VM4 may be experiencing a failure, may be currently undergoing maintenance, may be temporarily overloaded handling other voicemail calls, etc.

If VM4 130 is determined to be available (act 415), VM4 130 may store a voicemail message from the calling party in a conventional manner (act 420). For example, VM4 130 may play a prerecorded message to the calling party requesting that the calling party leave a voicemail message for the called party. VM4 130 may record the voicemail message in a well-known manner.

If, on the other hand, VM4 130 is determined to be unavailable (act 415), a backup VM device 130 may be identified (act 425). In one implementation, the backup VM device 130 may be randomly selected. In other implementations, a backup VM device 130 may be predetermined. For example, VM3 130 may be selected to serve as the backup for VM4 130 in those instances when VM4 130 is unavailable. Other techniques for selecting a backup VM device 130 may alternatively be used.

The call from the calling party may be routed to backup VM device 130 (act 425). VM3 130 (i.e., the backup VM device) may store a voicemail message from the calling party in a conventional manner (act 430). For example, backup VM3 130 may play a prerecorded message to the calling party requesting that the calling party leave a voicemail message for the called party. Backup VM3 130 may record the voicemail message in a well-known manner. In one implementation, backup VM3 130 may store an indication with the recorded voicemail message along with information identifying the called party. The indication may identify primary VM4 130.

Once the voicemail message has been obtained, backup VM3 130 may periodically check the availability of primary VM4 130 (act 435). In one implementation, backup VM3 130 may check the availability of primary VM4 130 by sending a status message to primary VM4 130 via, for example, network 140. If primary VM4 130 is available, VM4 130 may respond to the status message by sending a reply message to backup VM3 130. If no reply is received from primary VM4 130, backup VM3 130 may continue sending status messages until primary VM4 130 becomes available. The status messages may be sent at predetermined intervals, such as every minute, hour, or at some other time duration.

When primary VM4 130 becomes available, backup VM3 130 may transfer the voicemail message for the called party, along with information identifying the called party, to primary VM4 130 (act 440). In one implementation, backup VM3 130 may transfer the voicemail message via network 140. Primary VM4 130 may store the voicemail message in the voice mailbox associated with the called party (act 445).

Figure 5:
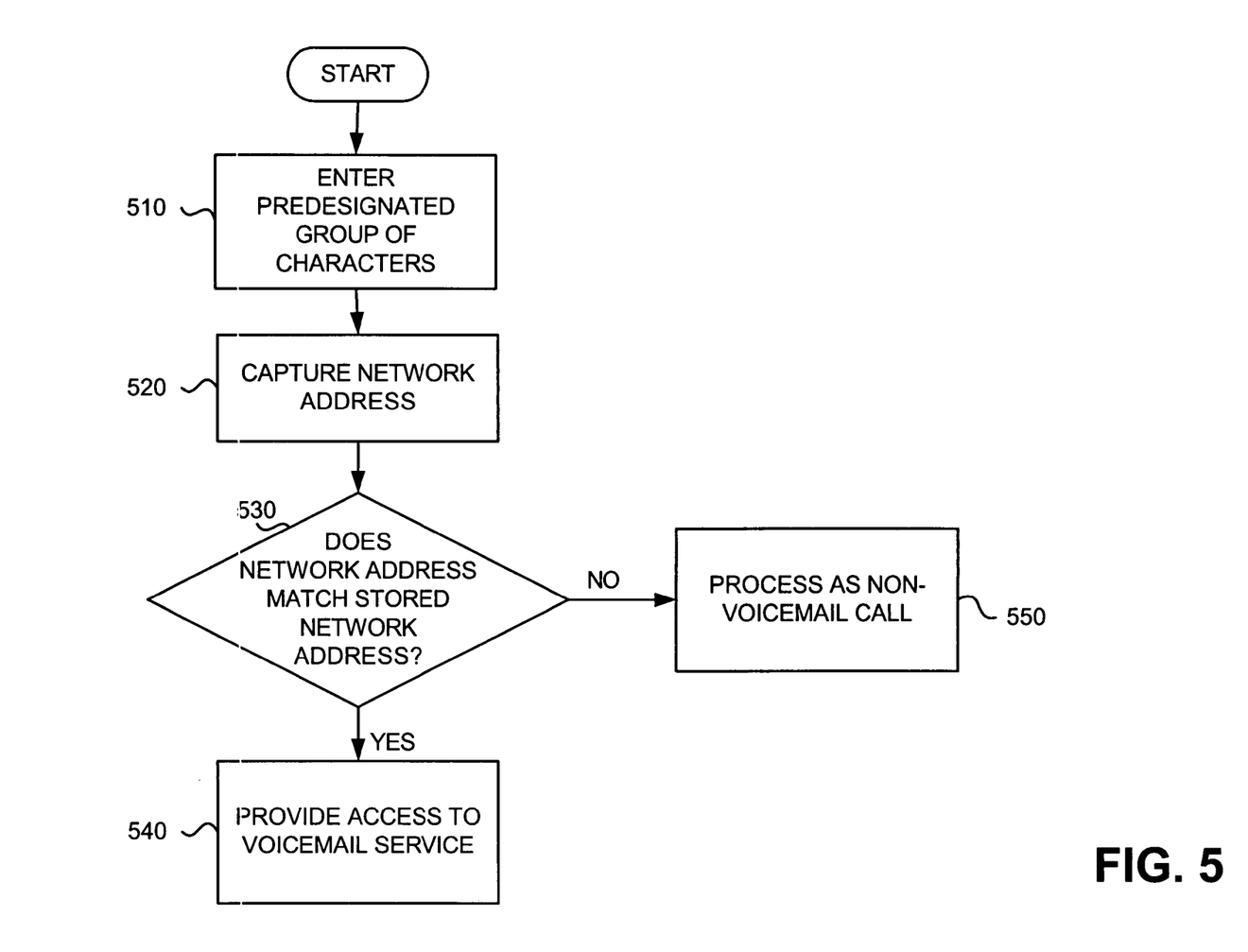
FIG. 5 illustrates an exemplary process for providing access to a voicemail service in an implementation consistent with the principles of the invention.

After the calling party has attempted to reach the called party and has left a voicemail message in the appropriate location (e.g., in primary VM4 130 in the example above), the called party may retrieve the voicemail message. FIG. 5 illustrates an exemplary process for providing access to a voicemail service in an implementation consistent with the principles of the invention. Processing may begin with the called party entering a predesignated group of characters (act 510). In one implementation, the predesignated group of characters may include a network address, such as, for example, a telephone number (e.g., an "800" number), an Internet address, etc., of VM device 130 with which the called party is associated. In another implementation, the predesignated group of characters includes the digits "00," "*3," or some other group of characters. The called party may enter the predesignated group of characters via a user device, such as user device 120.

In response to the called party entering the predesignated group of characters, the identity of user device 120 via which the called party entered the predesignated group of characters may be determined (act 520). In one implementation consistent with the principles of the invention, a network address associated with called party's user device 120 may be captured without interaction with the called party. For example, automatic number identification (ANI) techniques may be used to capture the telephone number associated with called party's user device 120. In other implementations, identification of user device 120 may involve identifying the subscriber loop associated with the called party's user device 120.

VM device 130 (or another device in system 100) may determine if the called party is associated with the voicemail system (act 530). In one implementation, the network address (e.g., telephone number) associated with called party's user device 120 may be compared to a list of network addresses stored, for example, in database 300. As set forth above, database 300 may store a list of network addresses that identify subscribers to the voicemail system that includes VM devices 130.

If the network address associated with called party's user device 120 matches a network address in database 300, the called party may be automatically provided with access to the called party's voicemail account (act 540). The called party may then perform conventional voicemail services. For example, the called party may then retrieve the voicemail message left by the calling party. If, on the other hand, the network address associated with called party's user device 120 does not match a network address in database 300, the called party's call may be handled as a non-voicemail call (act 550). For example, the called party may be automatically forwarded to an operator or provided with a list of options, which may or may not relate to voicemail services.

The following example illustrates the processing described above with respect to FIGS. 4A, 4B, and 5. In the following example, assume that system 100 is configured as the exemplary system 600 illustrated in FIG. 6. It will be appreciated that other configurations of system 100 are possible.

Figure 6:
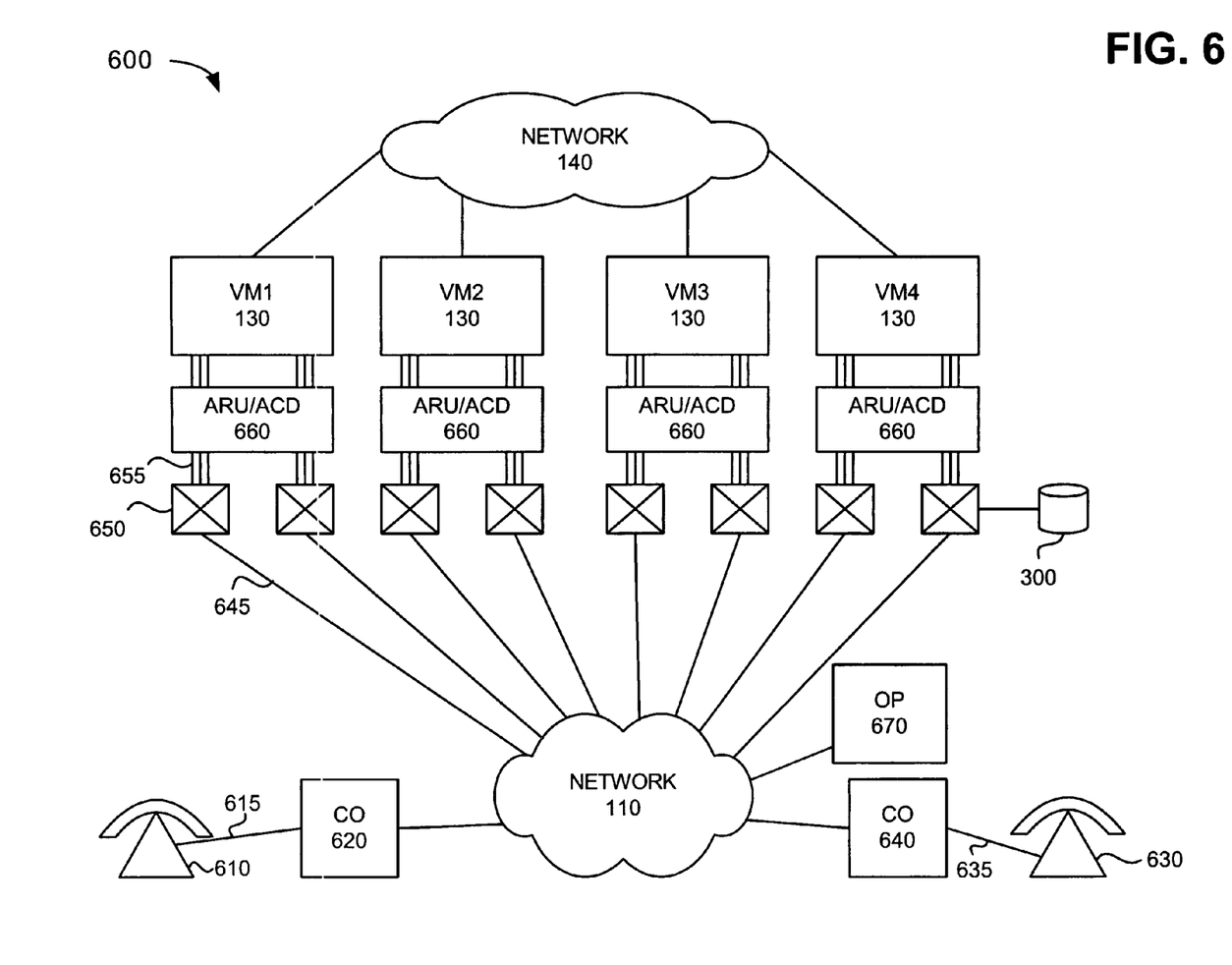
FIG. 6 illustrates an exemplary implementation of the processes described in FIGS. 4A, 4B, and 5 in an implementation consistent with the principles of the invention.

As illustrated, system 600 includes a calling party device 610, a first central office (CO) 620, a network 110, a called party device 630, a second central office 640, a group of bridging switches 650, a database 300, automated response unit (ARU)/automatic call distribution (ACD) units 660, VM devices 130, a network 140, and an operator device 670. Network 110, database 300, VM devices 130, and network 140 may be configured in a manner similar to that described above with respect to FIGS. 1 and 2.

Calling party device 610 and called party device 630 may include a telephone device, such as a POTS telephone. Central offices 620 and 640 may include local switching devices and equipment for connecting devices 610 and 630 to network 110. Calling party device 610 may connect to central office 620 via a subscriber loop 615. Similarly, called party device 630 may connect to central office 640 via a subscriber loop 635. Subscriber loops 615 and 635 may include a traditional twisted pair of wires.

Bridging switches 650 may include conventional bridging switches, such as Nortel Model MDS 250 switches, that are commonly used in conjunction with voice response units and the like. Bridging switches 650 may connect to network 110 and ARU/ACD units 660 via trunks 645 and 655, respectively. ARU/ACD units 660 may be associated with VM devices 130 and may include devices that interact with a caller, such as greeting the caller, prompting the caller to leave a message, etc. In one implementation consistent with the principles of the invention, ARU/ACD units 660 may include, or be coupled to, automatic and/or manual operator stations for providing interactivity with a caller. In some implementations, ARU/ACD units 660 may be implemented within VM devices 130. Operator device 670 may include a device by which an operator may interact with a caller.

If the calling party, using calling party device 610, attempts to call the called party at called party device 630, and called party device 630 is busy or rings without being answered, central office 640 may forward the call to a voice messaging system. In an implementation consistent with the principles of the invention, central office 630 may be provided with an '800' number to which the call is to be forwarded. This '800' number may correspond to one of bridging switches 650 coupled to a VM device 130 with which called party device 630 or subscriber loop 635 is associated.

The retrieval of an '800' number by which to route the call may invoke signaling and routing processes in a manner that is well known in the art of call processing. As a result, the call from the calling party may be routed to a VM device 130 via one of its corresponding bridging switches 650.

Assume for this example that VM4 130 is associated with called party device 630. Moreover, assume that it is determined that VM4 130 is unavailable. In this situation, central office 640 may route the call to another VM device 130, such as VM3 130. VM3 130 may terminate the call and record the voicemail message in a manner that is transparent to the calling party (i.e., the calling party may be unaware that a backup VM device is handling voicemail processing).

At a later time when the VM4 130 becomes available, VM3 130 may transfer the voicemail message from the calling party, along with information identifying the called party, to VM4 130. VM3 130 may transfer the voicemail message to VM4 130 via network 140. In response to receiving the voicemail message, VM4 130 may add the voicemail message to the voice mailbox associated with the called party.

After a caller, such as the calling party in the above example, has attempted to reach a called party and has created a voicemail message, the called party may retrieve the voicemail message. To facilitate accessing voicemail messages, implementations consistent with the principles of the invention provide direct access to voicemail accounts rather than requiring the called party to dial a telephone number and then provide authentication information to reach their voicemail account.

The called party may dial a predetermined sequence of characters to connect to his/her voicemail account. In one implementation, the called party may connect to his/her voicemail account by dialing an '800' number or some other predetermined sequence of characters, such as '00' or '*3'. Traditionally, when a party dials '00', a central office may be preconfigured to route the call to a long-distance operator at, for example, operator device 670, affiliated with an interexchange carrier or long-distance service provider. In an implementation consistent with the principles of the invention, in response to a party dialing '00', a central office may determine whether the called party is a subscriber to the voicemail system consistent with the principles of the invention. The central office may route the call to a bridging switch 650 where, for example, the telephone number of the called party may be compared to a list of stored subscriber identifiers in a database, such as database 300. If the called party's telephone number does not match an entry in the list of stored subscriber identifier, the call may be processed as a non-voicemail call (e.g., it may be routed to a long-distance operator). If, on the other hand, the called party's telephone number matches an entry in the list of stored subscriber identifiers, the call may be forwarded to the appropriate VM device 130 (i.e., the VM device associated with the called party). In this situation, the called party may be provided immediate access to his/her voicemail account without having to enter any authenticating information.

CONCLUSION

Implementations consistent with the principles of the invention provide improved voicemail processing. In one implementation, a group of voicemail devices is provided that is connected via a data network. The data network allows coordination amongst the voicemail devices in the event of a failure, maintenance outage, or temporary overloading of one of the devices. In such an event, another one of the voicemail devices can act as a backup and perform the functions of the voicemail device undergoing the event in a manner that is transparent to callers. In a second implementation, a voicemail system is provided that provides immediate voicemail access to subscribers when, for example, the subscriber's telephone number matches a list of stored subscriber numbers. In this way, the need for a subscriber to enter identifying information can be eliminated.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while the above description focused on providing voicemail backup in the situation where a voicemail device is experiencing an event that prohibits the voicemail device from performing voicemail processing, implementations consistent with the principles of the invention are not so limited. For example, backup voicemail processing may also occur within a VM device, such as among servers in a cluster that are each running the same voicemail client applications. Upon recovery of a primary server, a secondary server may coordinate with the primary server to ensure that voicemail messages received during the outage are forwarded to the primary server.

While series of acts have been described with respect to FIGS. 4A, 4B, and 5, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing, at a first voicemail server, a voicemail message, received from a calling party for a called party, on behalf of a second voicemail server;
   determining, by the first voicemail server, whether the second voicemail server is available following storing the voicemail message, the determining including:
   transferring the stored voicemail message to the second voicemail server when the second voicemail server is determined to be available;
   transferring a status message from the first voicemail server to the second voicemail server,
   determining that the second voicemail server is unavailable when no reply message is received from the second voicemail server,
   determining that the second voicemail server is available when a reply message is received from the second voicemail server;
   entering, via the called party, a predetermined sequence of characters at a network device;
   determining, in response to the called party entering the predetermined sequence of characters, whether to provide the called party with access to the voicemail message based on a network address associated with the called party's network device by comparing the network address associated with the called party's network device to a stored list of network addresses; and
   providing access to the voicemail message when the network address associated with the called party's network device matches a network address in the stored list of network addresses.

2. The method of claim 1 further comprising:
   storing the voicemail message in an appropriate voice mailbox on the second voicemail server.

3. The method of claim 1 where the transferring a status message includes:
   transferring the status message at predetermined intervals.

4. The method of claim 1 where the transferring a status message includes:
   transferring the status message via a data network.

5. The method of claim 1 where the transferring the stored voicemail message includes:
   transferring the stored voicemail message via a data network.

6. The method of claim 5 further comprising:
   receiving, prior to storing, the voicemail message via a Public Switched Telephone Network (PSTN).

7. The method of claim 1 where the providing access to the voicemail message includes:
   providing access without requiring the called party to enter identifying information.

8. The method of claim 1 where the network address includes a telephone number.

9. The method of claim 1 where the determining whether to provide access further includes:
   capturing the network address via an automatic number identification technique.

10. The method of claim 1 where the entering includes:
    entering 00 at the called party's network device.

11. The method of claim 1 where the entering includes:
    entering *3 at the called party's network device.

12. A system comprising:
    a first voicemail server configured to:
    receive a voicemail message for a called party,
    determine whether a second voicemail server is available following receiving the voicemail message, and
    transfer the voicemail message to the second voicemail server when the second voicemail server is determined to be available; where
    the first voicemail server is configured to transfer a status message to the second voicemail server and determine that the second voicemail server is available when a reply is received from the second voicemail server;
    the second voicemail server configured to:
    receive the transferred voicemail message;
    store the voicemail message in a mailbox associated with the called party, the first voicemail server being a backup voicemail server for the second voicemail server; and
    a network device configured to store a list of subscriber identifiers,
    where the second voicemail server provides the called party with access to the voicemail message via a called party user device in response to a network address associated with the called party user device matching a subscriber identifier in the list of subscriber identifiers.

13. The system of claim 12 where, when transferring the status message, the first voicemail server is configured to:
    transfer the status message at a periodic interval.

14. The system of claim 12 where, when transferring the status message, the first voicemail server is configured to:
    transfer the status message via a data network.

15. The system of claim 14 where the first voicemail server receives the voicemail message via a Public Switched Telephone Network (PSTN).

16. The system of claim 12 where the second-voicemail server provides the called party with access to the voicemail message without requiring authentication information from the called party.

17. A system comprising:
    a first voicemail server configured to:
    receive a voicemail message for a called party, determine whether a second voicemail server is available following receiving the voicemail message,
wherein the first voicemail server is configured to transfer a status message to the second voicemail server and determine that the second voicemail server is available when a reply is received from the second voicemail server;

transfer the voicemail message to the second voicemail server when the second voicemail server is determined to be available; and the second voicemail server configured to:
store the voicemail message in a mailbox associated with the called party, and automatically provide a network device associated with the called party with access to the voicemail message in response to a network address associated with the network device matching a subscriber identifier in a list of subscriber identifiers stored in the network device.

* * * * *